(12) United States Patent
Tseng et al.

(10) Patent No.: US 10,857,453 B2
(45) Date of Patent: Dec. 8, 2020

(54) BUTTON ASSEMBLY AND GAME CONTROLLER INCLUDING THE SAME

(71) Applicant: Cheng Uei Precision Industry Co., Ltd., New Taipei (TW)

(72) Inventors: Chi-Ming Tseng, New Taipei (TW); Tsung-Shih Lee, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/403,469

(22) Filed: May 3, 2019

(65) Prior Publication Data
US 2020/0230495 A1 Jul. 23, 2020

(30) Foreign Application Priority Data
Jan. 21, 2019 (CN) ...................... 2019 2 0097238 U

(51) Int. Cl.
*A63F 13/24* (2014.01)
*A63F 13/218* (2014.01)
*A63F 9/24* (2006.01)

(52) U.S. Cl.
CPC .............. *A63F 13/218* (2014.09); *A63F 9/24* (2013.01); *A63F 2009/2408* (2013.01); *A63F 2009/2442* (2013.01); *A63F 2300/1043* (2013.01)

(58) Field of Classification Search
CPC .. A63F 13/24; A63F 13/98; A63F 2300/1043; G01L 1/22; G06F 3/0202; H01H 13/14; H01H 2211/032
See application file for complete search history.

(56) References Cited

U.S. PATENT DOCUMENTS

| 4,528,428 A * | 7/1985 | Gotoh | H01H 13/84 200/5 A |
| 5,936,554 A * | 8/1999 | Stanek | G06F 3/0219 200/5 A |
| 2018/0166231 A1* | 6/2018 | Wu | H01H 13/705 |

* cited by examiner

*Primary Examiner* — Lawrence S Galka
(74) *Attorney, Agent, or Firm* — Cheng-Ju Chiang

(57) ABSTRACT

A button assembly adapted for being mounted in a game controller. The button assembly includes a pedestal, a pressure sensor module and a key cap. A middle of the pedestal has an accommodating groove penetrating upward through a top surface of the middle of the pedestal. Two opposite sides of the pedestal have two limiting portions oppositely protruded outward. The pressure sensor module is mounted in the accommodating groove of the pedestal. The key cap is covered on the pressure sensor module. A bottom surface of the key cap has a contact portion contacting with the pressure sensor module. Two opposite sides of the key cap have two active portions protruded outward. The two active portions are mounted to the two limiting portions, respectively. In processes of pressing and releasing the key cap, the two active portions move downward and upward with respect to the two limiting portions.

18 Claims, 6 Drawing Sheets

BUTTON ASSEMBLY AND GAME CONTROLLER INCLUDING THE SAME

CROSS-REFERENCE TO RELATED APPLICATION

The present application is based on, and claims priority form, China Patent Application No. 201920097238.9, filed Jan. 21, 2019, the disclosure of which is hereby incorporated by reference herein in its entirety.

BACKGROUND OF THE INVENTION

1. Field of the Invention

The present invention generally relates to a button assembly, and more particularly to a modular button assembly, and a game controller including the button assembly.

2. The Related Art

A conventional game controller includes a top cover and a button assembly. The button assembly includes a pressure sensor. The pressure sensor realizes a pressure sensing function by virtue of a pressure sensing element or charges of a flexible printed circuit board. When a force exerted by a finger on the pressure sensor is larger, a pressed area of the pressure sensor is larger, the flexible printed circuit board will sense pressure signals and convert the pressure signals into digital signals, and then the digital signals are converted into pressure force values. When the conventional game controller is assembled, the top cover is covered to the button assembly, and the pressure sensor is assembled under the top cover. When a user uses the conventional game controller, the user will press the button assembly, the button assembly will be pressed downward to contact with a top surface of the pressure sensor in advance for completing pressing the button assembly.

However, the above-mentioned conventional game controller is easily affected by accumulated tolerances of a structure of the conventional game controller to cause values to be overly changed at the time of the button assembly being pressed. Moreover, if the button assembly is broken, the broken button assembly is hardly distinguished to be caused by the pressure sensor or other structures and the broken button assembly is hardly changed.

Thus, it is essential to provide a modular button assembly, and an innovative game controller including the button assembly, the button assembly includes a pressure sensor to make the pressure sensor of which a material is a soft foam material have fewer accumulated tolerances and a higher sensing sensitivity in use, and the button assembly applied in the game controller may be easily detected and changed.

SUMMARY OF THE INVENTION

An object of the present invention is to provide a button assembly adapted for being mounted in a game controller. The button assembly includes a pedestal, a pressure sensor module and a key cap. A middle of the pedestal has an accommodating groove penetrating upward through a top surface of the middle of the pedestal. Two opposite sides of the pedestal have two limiting portions oppositely protruded outward. The pressure sensor module is mounted in the accommodating groove of the pedestal. The key cap is covered on the pressure sensor module. A bottom surface of the key cap has a contact portion contacting with the pressure sensor module. Two opposite sides of the key cap have two active portions protruded outward. The two active portions are mounted to the two limiting portions, respectively. In processes of pressing and releasing the key cap, the two active portions move downward and upward with respect to the two limiting portions. The pedestal has a base portion, each limiting portion has a lower extending portion extending outward from one side of the base portion, tail ends of the lower extending portions of the two limiting portions open two limiting holes, the two active portions are movably inserted downward into the two limiting holes, the key cap has a main portion, the two active portions have two upper extending portions extended oppositely outward from two sides of the main portion, the two upper extending portions are disposed above the two lower extending portions, bottoms of two free ends of the two upper extending portions protrude downward to form two protruding blocks disposed corresponding to the two limiting holes, respectively, bottoms of outer surfaces of the two protruding blocks protrude oppositely outward to form two stopping blocks, when the key cap is assembled to the pressure sensor module and the pedestal, the two protruding blocks penetrate downward through the two limiting holes, respectively, top surfaces of the two stopping blocks abut against bottom surfaces of the two lower extending portions of the two limiting portions.

Another object of the present invention is to provide a button assembly adapted for being mounted in a game controller. The button assembly includes a fastening frame mounted under the button assembly, a circuit board mounted under the fastening frame and the button assembly, an outer shell and a top cover. The button assembly includes a pedestal, a pressure sensor module and a key cap. A middle of the pedestal has an accommodating groove penetrating upward through a top surface of the middle of the pedestal. Two opposite sides of the pedestal have two limiting portions oppositely protruded outward. The pedestal has a base portion. Two opposite sides of a peripheral surface of the base portion extend upward to form two limiting blocks. The pressure sensor module is mounted in the accommodating groove of the pedestal. The pressure sensor module has a fastening portion. A portion of a periphery of the fastening portion protrudes outward to form a locating portion. The key cap is covered on the pressure sensor module. A bottom surface of the key cap has a contact portion contacting with the pressure sensor module. Two opposite sides of the key cap have two active portions protruded outward. The two active portions are mounted to the two limiting portions, respectively. In processes of pressing and releasing the key cap, the two active portions move downward and upward with respect to the two limiting portions. Two free ends of the two limiting blocks adjacent to the locating portion gradually approach each other and are spaced from each other to form a locating groove between the two free ends of the two limiting blocks adjacent to the locating portion. The locating portion is positioned in the locating groove.

Another object of the present invention is to provide a button assembly adapted for being mounted in a game controller. The game controller includes a circuit board, and a fastening frame mounted on the circuit board. A bottom surface of the circuit board is equipped with a second capacitor. One side of the fastening frame opens a guiding groove vertically penetrating through the fastening frame. The button assembly includes a pedestal, a pressure sensor module and a key cap. Two opposite sides of the pedestal have two limiting portions oppositely protruded outward. The pressure sensor module is mounted in the pedestal. The pressure sensor module has a fastening portion, and a first capacitor extended outward from one side of the fastening portion. The first capacitor is bent downward and passes through the guiding groove, and then is bent towards the second capacitor, a tail end of the first capacitor is connected with the second capacitor. A top of the pressure sensor module has a soft material sensor. The soft material sensor has an elasticity. The key cap is covered on the pressure sensor module. A bottom surface of the key cap has a contact portion contacting with the pressure sensor module. Two opposite sides of the key cap have two active portions protruded outward. The two active portions are mounted to the two limiting portions, respectively. In processes of pressing and releasing the key cap, the two active portions move downward and upward with respect to the two limiting portions.

As described above, the button assembly is capable of being pressed by virtue of the two limiting portions and the two active portions being disposed among the pedestal, the pressure sensor module and the key cap, and furthermore, the pressure sensor module and the key cap of the button assembly are assembled to form a combination module, the combination module is mounted on the pedestal, so that the button assembly reaches a modular requirement, the button assembly applied in the game controller may be easily detected and changed, and the combination module is flexibly able to be assembled to or changed in other structures of which each is matched with the combination module. In addition, when a user presses the modular button assembly, a pressing force is transmitted to the pressure sensor module through the key cap, comparing the modular button assembly with a button assembly of the conventional game controller, the modular button assembly has fewer accumulated tolerances and a higher sensing sensitivity in use.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
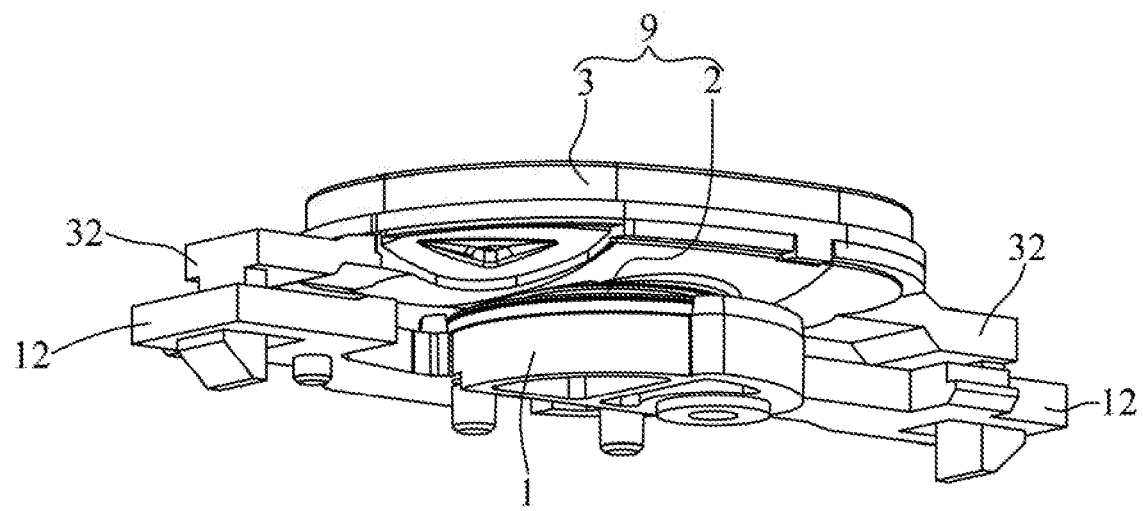
FIG. 1 is a perspective view of a button assembly in accordance with a preferred embodiment of the present invention.

With reference to FIG. 1 to FIG. 5, a button assembly 100 and a game controller 200 in accordance with a preferred embodiment of the present invention are shown. The game controller 200 includes the button assembly 100. The button assembly 100 adapted for being mounted in the game controller 200, includes a pedestal 1, a pressure sensor module 2 and a key cap 3.

The pedestal 1 has a circular base portion 101. A peripheral surface of the base portion 101 of the pedestal 1 has a plurality of arc-shaped limiting blocks 111, so that a middle of the pedestal 1 has an accommodating groove 11 penetrating upward through a top surface of the middle of the pedestal 1 and the accommodating groove 11 is surrounded by the plurality of the limiting blocks 111. In the preferred embodiment, two opposite sides of the peripheral surface of the base portion 101 protrude outward and then extend upward to form two arc-shaped limiting blocks 111, so that the middle of the pedestal 1 has the accommodating groove 11 penetrating upward through the top surface of the middle of the pedestal 1 and surrounded by the two limiting blocks 111.

Two opposite sides of the pedestal 1 have two limiting portions 12 oppositely protruded outward. The two opposite sides of the peripheral surface of the base portion 101 extend oppositely outward to form the two limiting portions 12 connected with two opposite sides of two outer surfaces of the two limiting blocks 111 away from each other, respectively. Each limiting portion 12 has a lower extending portion 121 extending outward from one side of the base portion 101. Tail ends of the lower extending portions 121 of the two limiting portions 12 open two limiting holes 122. Two sides of the two limiting portions 12 protrude oppositely outward to form two propping blocks 123. Outer sides of top surfaces of the two propping blocks 123 are recessed downward to form two locking grooves 124. The base portion 101 opens a fastening hole 13 vertically penetrating through the base portion 101. A bottom of the base portion 101 protrudes downward to form a hollow fixing pillar 16. A middle of the fixing pillar 16 opens a fixing hole 161 corresponding to a middle of the fastening hole 13 and communicated with the fastening hole 13.

The pressure sensor module 2 is mounted in the accommodating groove 11 of the pedestal 1. A top of the pressure sensor module 2 has a circular soft material sensor 21. The pressure sensor module 2 has a fastening portion 23, and a first capacitor 22 extended outward from one side of the fastening portion 23. The pressure sensor module 2 includes the circular soft material sensor 21 mounted on a middle of a top of the fastening portion 23. A portion of a periphery of the fastening portion 23 protrudes outward to form a locating portion 24. Two opposite sides of the locating portion 24 extend beyond two opposite sides of the soft material sensor 21. Two free ends of the two limiting blocks 111 adjacent to the locating portion 24 gradually approach each other and are spaced from each other to form a locating groove 102 between the two free ends of the two limiting blocks 111 adjacent to the locating portion 24. The locating portion 24 is positioned in and located in the locating groove 102.

Figure 2:
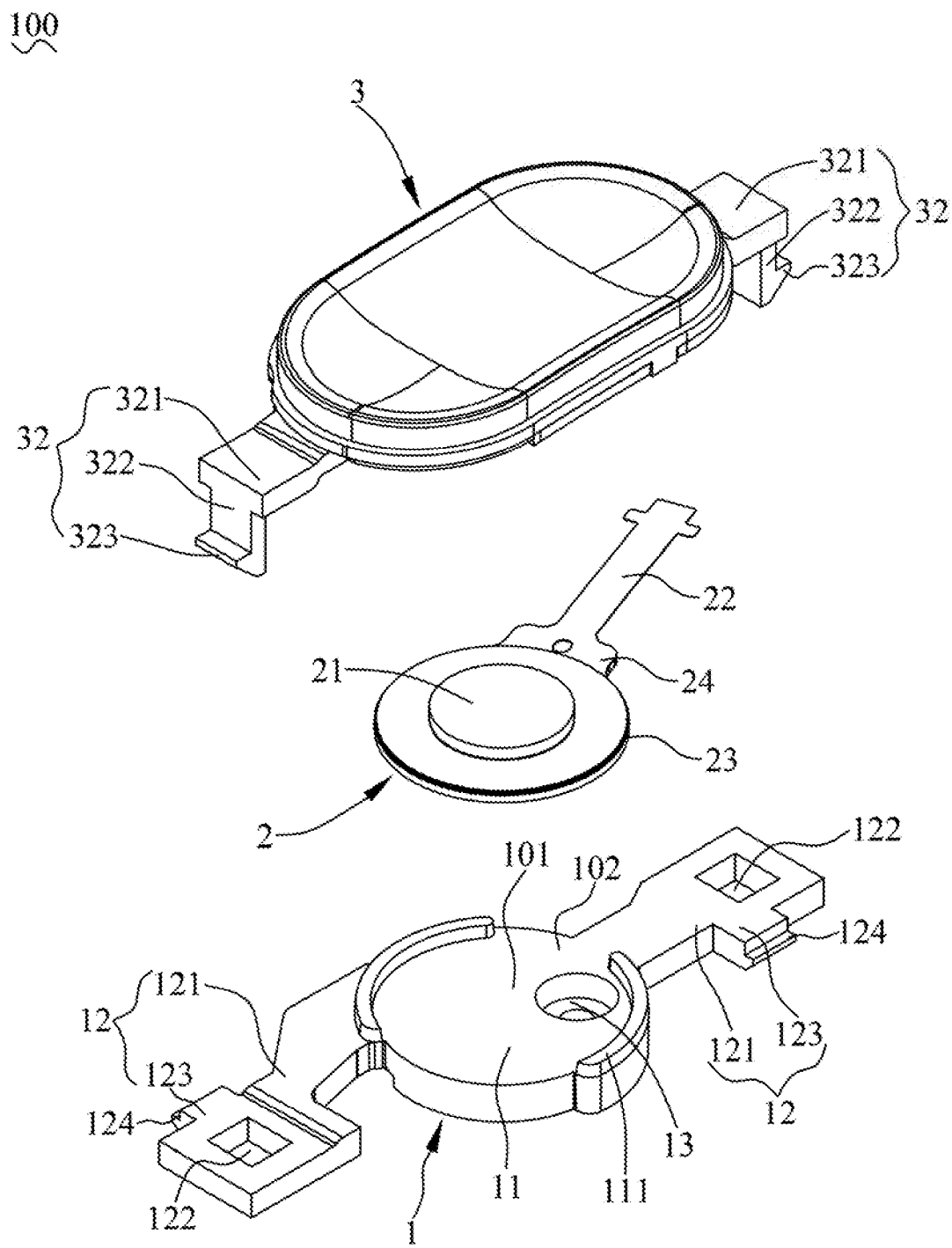
FIG. 2 is an exploded perspective view of the button assembly of FIG. 1.
Figure 3:
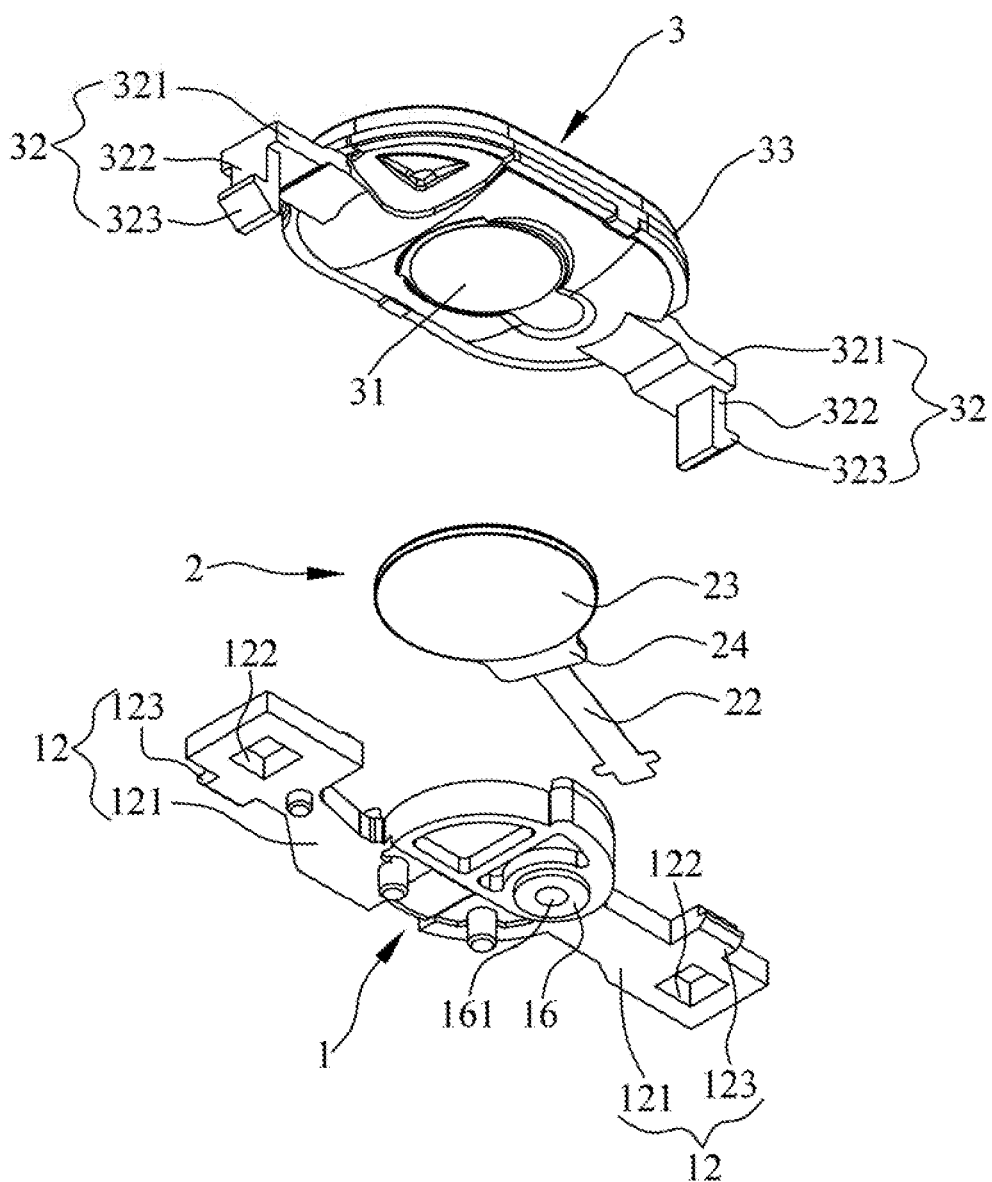
FIG. 3 is another exploded perspective view of the button assembly of FIG. 2.
Figure 4:
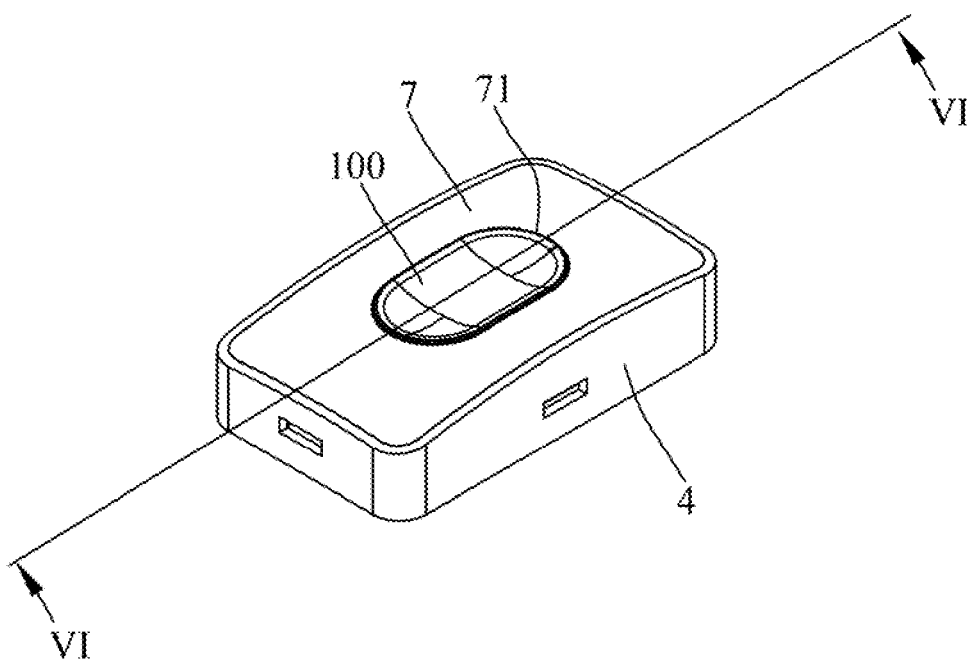
FIG. 4 is a perspective view of a game controller, wherein the button assembly is assembled in the game controller in accordance with the preferred embodiment of the present invention.
Figure 5:
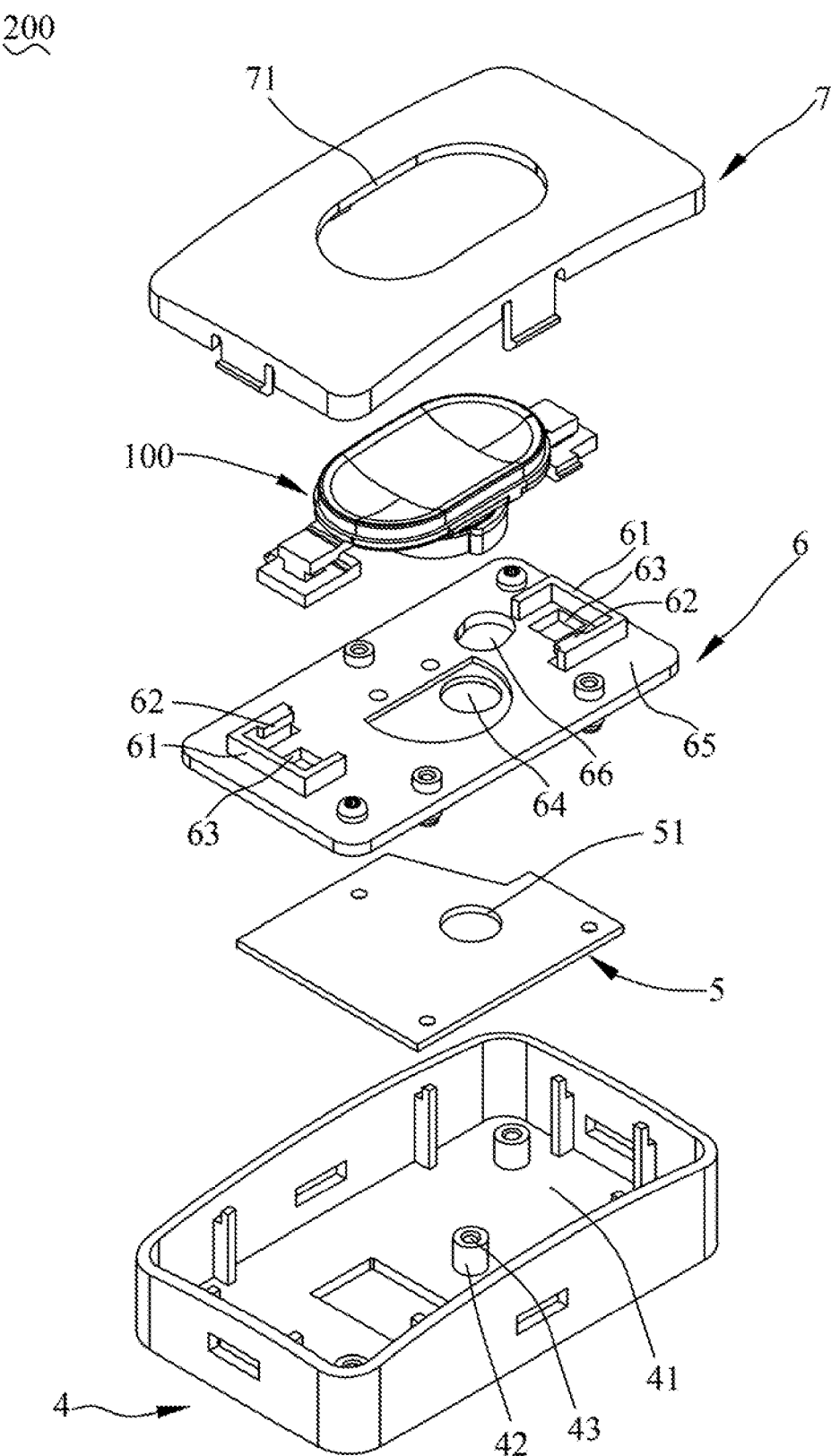
FIG. 5 is an exploded perspective view of the game controller of FIG. 4.
Figure 6:
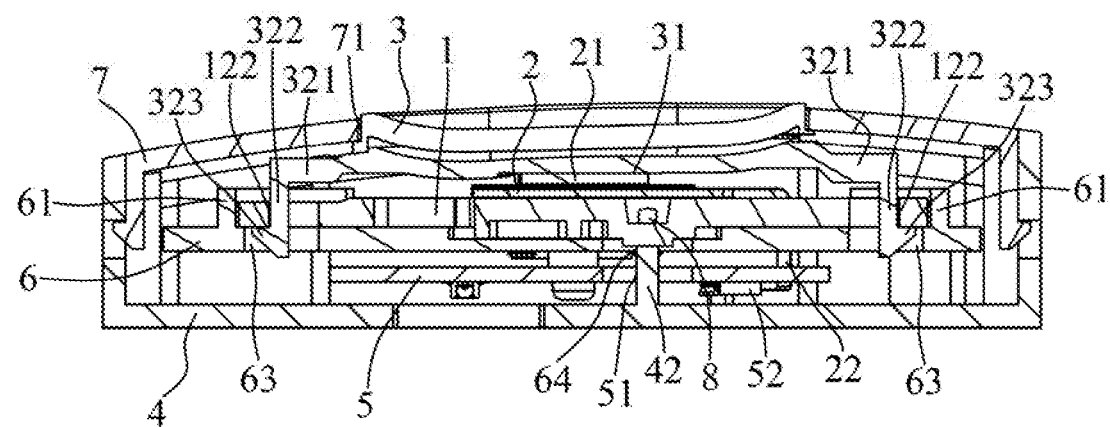
FIG. 6 is a sectional perspective view of the game controller along a line VI-VI of FIG. 4.

With reference to FIG. 2 and FIG. 3, the key cap 3 is covered on the pressure sensor module 2. A bottom surface of the key cap 3 has a contact portion 31 contacting with the pressure sensor module 2. Two opposite sides of the key cap 3 have two active portions 32 protruded outward. The key cap 3 has an elliptical main portion 33. A bottom surface of the main portion 33 has the contact portion 31 matched with the soft material sensor 21. The contact portion 31 contacts with a top surface of the soft material sensor 21. Two opposite sides of the main portion 33 protrude outward to form the two active portions 32. The two active portions 32 are mounted to the two limiting portions 12, respectively. The two active portions 32 are capable of moving upward and downward in the two limiting portions 12. In processes of pressing and releasing the key cap 3, the two active portions 32 move downward and upward with respect to the two limiting portions 12. The two active portions 32 are movably inserted downward into the two limiting holes 122.

The two active portions 32 have two upper extending portions 321 extended oppositely outward from the two sides of the main portion 33. The two upper extending portions 321 are disposed above the two lower extending portions 121 of the two limiting portions 12. Bottoms of two free ends of the two upper extending portions 321 protrude downward to form two protruding blocks 322. The two protruding blocks 322 are disposed corresponding to the two limiting holes 122, respectively. Bottoms of outer surfaces of the two protruding blocks 322 protrude oppositely outward to form two stopping blocks 323. When the key cap 3 is assembled to the pressure sensor module 2 and the pedestal 1, the two protruding blocks 322 penetrate downward through the two limiting holes 122, respectively. Top surfaces of the two stopping blocks 323 abut against bottom surfaces of the two lower extending portions 121 of the two limiting portions 12.

Because the button assembly 100 uses the soft material sensor 21, a sensing sensitivity of the pressure sensor module 2 is higher than sensing sensitivities of a flexible printed circuit board and a pressure sensing component. When a user presses the pressure sensor module 2, pressure values are easily caused to be overly changed, so the pressure sensor module 2 of the button assembly 100 in accordance with the present invention is assembled in and between the pedestal 1 and the key cap 3. When the key cap 3 of the button assembly 100 is pressed by the user, the soft material sensor 21 shows a sunken status, the two protruding blocks 322 pass through the two limiting holes 122 and move downward along the two limiting holes 122 respectively to make the two upper extending portions 321 move downward, so that the user proceeds a downward pressed action on the key cap 3.

Because the soft material sensor 21 has an elasticity, when the user presses a portion of the key cap 3, a part of the soft material sensor 21 corresponding to the portion of the key cap 3 is pressed downward by the key cap 3, at the moment, the part of the soft material sensor 21 corresponding to the portion of the key cap 3 will generate a sunken area on account of the soft material sensor 21 bearing a force exerted by the key cap 3, at the moment, the sunken area of the soft material sensor 21 will generate an upward resilience due to the elasticity of the soft material sensor 21. Specifically, when the user presses a portion of the main portion 33 of the key cap 3, a portion of the soft material sensor 21 corresponding to the portion of the main portion 33 of the key cap 3 is pressed downward by the key cap 3, at the moment, the portion of the soft material sensor 21 corresponding to the portion of the main portion 33 of the key cap 3 will generate the sunken area on account of the soft material sensor 21 bearing the force exerted by the key cap 3, at the moment, the sunken area of the soft material sensor 21 will generate the upward resilience due to the elasticity of the soft material sensor 21.

When the key cap 3 of the button assembly 100 is released, the soft material sensor 21 which shows the sunken status will rebound upward to return to an original status so as to push upward the contact portion 31 and make the two protruding blocks 322 of the two upper extending portions 321 move upward along the two limiting holes 122, and then the key cap 3 is returned to an initial status. At the moment, the top surfaces of the two stopping blocks 323 abut against the bottom surfaces of the two lower extending portions 121 of the two limiting portions 12 for offsetting the upward resilience generated by the soft material sensor 21 to steadily maintain the key cap 3 in the initial status, so a pressed action of the button assembly 100 is completed.

With reference to FIG. 1 to FIG. 6, the button assembly 100 in accordance with the present invention is applied in the game controller 200. The game controller 200 includes an outer shell 4, a circuit board 5, a fastening frame 6 and a top cover 7.

The outer shell 4 is of a hollow rectangular shape. A top of the outer shell 4 is opened freely and communicated with an outside. The outer shell 4 has an accommodating space 41 penetrating through a top of the outer shell 4 and communicated with the outside. The fastening frame 6 is mounted under the button assembly 100. The circuit board 5 is mounted under the fastening frame 6 and the button assembly 100. The circuit board 5 and the fastening frame 6 together with the button assembly 100 are disposed in the accommodating space 41 of the outer shell 4. An inner surface of a bottom of the outer shell 4 protrudes upward to form a protruding pillar 42 projecting into the accommodating space 41. A middle of a top surface of the protruding pillar 42 is recessed downward to form a fastening groove 43. The fastening groove 43 of the protruding pillar 42 is corresponding to the fixing hole 161 and the fastening hole 13.

The circuit board 5 is assembled in the outer shell 4. The circuit board 5 has a connecting hole 51. A bottom surface of the circuit board 5 is equipped with a second capacitor 52. The fastening frame 6 is mounted on the circuit board 5 and is mounted in the outer shell 4. The fastening frame 6 has a rectangular main board 65. Top surfaces of two opposite sides of the main board 65 protrude upward to form two U-shaped restricting portions 61. Mouths of the two restricting portions 61 face each other. The two restricting portions 61 are disposed corresponding to the two limiting portions 12. Inner surfaces of upper portions of the two restricting portions 61 protrude inward to form two resisting blocks 62. In the preferred embodiment, an inner surface of an upper portion of one side of one restricting portion 61 protrudes inward to form one resisting block 62. An inner surface of an upper portion of one side of the other restricting portion 61 facing to the other side of the one restricting portion 61 protrudes inward to form the other resisting block 62.

The two opposite sides of the main board 65 open two active holes 63 vertically penetrating through the two opposite sides of the main board 65. The two active holes 63 are surrounded by the two restricting portions 61, respectively. A substantial middle of the fastening frame 6 opens a locating hole 64 corresponding to and communicated with the connecting hole 51. The protruding pillar 42 passes upward through the connecting hole 51 and the locating hole 64. One side of the fastening frame 6 opens a guiding groove 66 vertically penetrating through the fastening frame 6. The top cover 7 is covered on the outer shell 4, and the top cover 7 covers the button assembly 100, the circuit board 5 and the fastening frame 6 which are mounted in the outer shell 4. A middle of the top cover 7 opens an elliptical opening 71 vertically penetrating through the top cover 7. The opening 71 is disposed corresponding to the button assembly 100. Specifically, the opening 71 is corresponding to the key cap 3.

The button assembly 100 is assembled in the game controller 200. The fixing hole 161 and the middle of the fastening hole 13 of the pedestal 1 are corresponding to the fastening groove 43. The game controller 200 further includes a fastening element 8. The fastening element 8 passes through and is fastened in the fastening hole 13, the fixing hole 161 and the fastening groove 43 of the protruding pillar 42 passing upward through the connecting hole 51. The first capacitor 22 is bent downward and passes through the guiding groove 66, and then is bent towards the second capacitor 52, a tail end of the first capacitor 22 is connected with the second capacitor 52. The two limiting portions 12 are assembled in the two restricting portions 61, respectively.

The outer sides of the top surfaces of the two propping blocks 123 are located under the two resisting blocks 62 of the two restricting portions 61, respectively. The two resisting blocks 62 are received in the two locking grooves 124, respectively, so that the two limiting portions 12 are limited by the two resisting blocks 62 and the pedestal 1 is fastened on the fastening frame 6. The two limiting holes 122 are corresponding to the two active holes 63. Lower portions of the two protruding blocks 322 penetrate through the two limiting holes 122 and the two active holes 63, respectively. When the button assembly 100 is pressed by the user, the two limiting holes 122 and the two active holes 63 allow the two protruding blocks 322 to move upward and downward in the game controller 200. The top cover 7 is covered on the outer shell 4. The top cover 7 covers the circuit board 5, the fastening frame 6 which are mounted in the outer shell 4, and the button assembly 100. The key cap 3 is exposed outside from the opening 71. So the button assembly 100 is assembled in the game controller 200.

The pressure sensor module 2 and the key cap 3 of the button assembly 100 are assembled to form a combination module 9. The combination module 9 is mounted on the pedestal 1. The combination module 9 is capable of being assembled to other structures of which each is matched with the combination module 9, so the button assembly 100 in accordance with the present invention is without being limited to the above-mentioned detailed description disclosed in the preferred embodiment.

As described above, the button assembly 100 is capable of being pressed by virtue of the two limiting portions 12 and the two active portions 32 being disposed among the pedestal 1, the pressure sensor module 2 and the key cap 3, and furthermore, the pressure sensor module 2 and the key cap 3 of the button assembly 100 are assembled to form the combination module 9, the combination module 9 is mounted on the pedestal 1, so that the button assembly 100 reaches a modular requirement, the button assembly 100 applied in the game controller 200 may be easily detected and changed, and the combination module 9 is flexibly able to be assembled to or changed in the other structures of which each is matched with the combination module 9. In addition, when the user presses the modular button assembly 100, a pressing force is transmitted to the pressure sensor module 2 through the key cap 3, comparing the modular button assembly 100 with a button assembly of the conventional game controller, the modular button assembly 100 has fewer accumulated tolerances and a higher sensing sensitivity in use.

What is claimed is:

1. A button assembly adapted for being mounted in a game controller, comprising:
    a pedestal, a middle of the pedestal having an accommodating groove penetrating upward through a top surface of the middle of the pedestal, two opposite sides of the pedestal having two limiting portions oppositely protruded outward;
    a pressure sensor module mounted in the accommodating groove of the pedestal; and
    a key cap covered on the pressure sensor module, a bottom surface of the key cap having a contact portion contacting with the pressure sensor module, two opposite sides of the key cap having two active portions protruded outward, the two active portions being mounted to the two limiting portions, respectively, in processes of pressing and releasing the key cap, the two active portions moving downward and upward with respect to the two limiting portions;
    wherein the pedestal has a base portion, each limiting portion has a lower extending portion extending outward from one side of the base portion, tail ends of the lower extending portions of the two limiting portions open two limiting holes, the two active portions are movably inserted downward into the two limiting holes, the key cap has a main portion, the two active portions have two upper extending portions extended oppositely outward from two sides of the main portion, the two upper extending portions are disposed above the two lower extending portions, bottoms of two free ends of the two upper extending portions protrude downward to form two protruding blocks disposed corresponding to the two limiting holes, respectively, bottoms of outer surfaces of the two protruding blocks protrude oppositely outward to form two stopping blocks, when the key cap is assembled to the pressure sensor module and the pedestal, the two protruding blocks penetrate downward through the two limiting holes, respectively, top surfaces of the two stopping blocks abut against bottom surfaces of the two lower extending portions of the two limiting portions.

2. The button assembly as claimed in claim 1, wherein a top of the pressure sensor module has a soft material sensor, when the key cap is pressed, the soft material sensor shows a sunken status, the two protruding blocks pass through the two limiting holes and move downward along the two limiting holes respectively to make the two upper extending portions move downward, when the key cap is released, the soft material sensor which shows the sunken status will rebound upward to return to an original status so as to push upward the contact portion and make the two protruding blocks move upward along the two limiting holes, and then the key cap is returned to an initial status.

3. The button assembly as claimed in claim 1, wherein a peripheral surface of the base portion of the pedestal has a plurality of limiting blocks, so that the accommodating groove is surrounded by the plurality of the limiting blocks.

4. The button assembly as claimed in claim 1, wherein the pressure sensor module has a fastening portion, and includes a soft material sensor mounted on a top of the fastening portion, the contact portion contacts with a top surface of the soft material sensor.

5. The button assembly as claimed in claim 4, wherein the soft material sensor has an elasticity.

6. A button assembly adapted for being mounted in a game controller, comprising:
    a pedestal, a middle of the pedestal having an accommodating groove penetrating upward through a top surface of the middle of the pedestal, two opposite sides of the pedestal having two limiting portions oppositely protruded outward, the pedestal having a base portion, two opposite sides of a peripheral surface of the base portion extending upward to form two limiting blocks;
    a pressure sensor module mounted in the accommodating groove of the pedestal, the pressure sensor module having a fastening portion, a portion of a periphery of the fastening portion protruding outward to form a locating portion; and a key cap covered on the pressure sensor module, a bottom surface of the key cap having a contact portion contacting with the pressure sensor module, two opposite sides of the key cap having two active portions protruded outward, the two active portions being mounted to the two limiting portions, respectively, in processes of pressing and releasing the key cap, the two active portions moving downward and upward with respect to the two limiting portions;

wherein two free ends of the two limiting blocks adjacent to the locating portion gradually approach each other and are spaced from each other to form a locating groove between the two free ends of the two limiting blocks adjacent to the locating portion, the locating portion is positioned in the locating groove.

7. The button assembly as claimed in claim 6, wherein the pedestal has the base portion, each limiting portion has a lower extending portion extending outward from one side of the base portion, tail ends of the lower extending portions of the two limiting portions open two limiting holes, the two active portions are movably inserted downward into the two limiting holes.

8. The button assembly as claimed in claim 7, wherein the key cap has a main portion, the two active portions have two upper extending portions extended oppositely outward from two sides of the main portion, the two upper extending portions are disposed above the two lower extending portions, bottoms of two free ends of the two upper extending portions protrude downward to form two protruding blocks disposed corresponding to the two limiting holes, respectively, bottoms of outer surfaces of the two protruding blocks protrude oppositely outward to form two stopping blocks, when the key cap is assembled to the pressure sensor module and the pedestal, the two protruding blocks penetrate downward through the two limiting holes, respectively, top surfaces of the two stopping blocks abut against bottom surfaces of the two lower extending portions of the two limiting portions.

9. The button assembly as claimed in claim 8, wherein a top of the pressure sensor module has the soft material sensor, when the key cap is pressed, the soft material sensor shows a sunken status, the two protruding blocks pass through the two limiting holes and move downward along the two limiting holes respectively to make the two upper extending portions move downward, when the key cap is released, the soft material sensor which shows the sunken status will rebound upward to return to an original status so as to push upward the contact portion and make the two protruding blocks move upward along the two limiting holes, and then the key cap is returned to an initial status.

10. The button assembly as claimed in claim 8, wherein the game controller further includes a fastening frame, the fastening frame is mounted under the button assembly, the fastening frame has a main board, top surfaces of two opposite sides of the main board protrude upward to form two U-shaped restricting portions of which mouths face each other, the two restricting portions are disposed corresponding to the two limiting portions, the two opposite sides of the main board open two active holes vertically penetrating through the two opposite sides of the main board, the two limiting holes are corresponding to the two active holes, lower portions of the two protruding blocks penetrate through the two limiting holes and the two active holes, respectively, when the button assembly is pressed, the two limiting holes and the two active holes allow the two protruding blocks to move upward and downward in the game controller.

11. The button assembly as claimed in claim 10, wherein two sides of the two limiting portions protrude oppositely outward to form two propping blocks, inner surfaces of upper portions of the two restricting portions protrude inward to form two resisting blocks, outer sides of top surfaces of the two propping blocks are recessed downward to form two locking grooves, the outer sides of the top surfaces of the two propping blocks are located under the two resisting blocks, respectively, the two resisting blocks are received in the two locking grooves, respectively.

12. The button assembly as claimed in claim 7, wherein a peripheral surface of the base portion of the pedestal has a plurality of the limiting blocks, so that the accommodating groove is surrounded by the plurality of the limiting blocks.

13. The button assembly as claimed in claim 7, further comprising a fastening element, the base portion opening a fastening hole vertically penetrating through the base portion, the game controller further includes a fastening frame, a circuit board and an outer shell, the fastening frame is mounted under the button assembly, the circuit board is mounted under the fastening frame and the button assembly, the outer shell contains the circuit board, the fastening frame and the button assembly, an inner surface of a bottom of the outer shell protruding upward to form a protruding pillar, a middle of a top surface of the protruding pillar being recessed downward to form a fastening groove, a bottom of the base portion protruding downward to form a hollow fixing pillar of which a middle opens a fixing hole corresponding to a middle of the fastening hole, the circuit board having a connecting hole, the fastening frame opening a locating hole corresponding to and communicated with the connecting hole, the protruding pillar passing upward through the connecting hole and the locating hole, the fastening element passing through and being fastened in the fastening hole, the fixing hole and the fastening groove.

14. The button assembly as claimed in claim 6, wherein the pressure sensor module has the fastening portion, and includes the soft material sensor mounted on the top of the fastening portion, the contact portion contacts with a top surface of the soft material sensor.

15. The button assembly as claimed in claim 14, wherein the soft material sensor has an elasticity.

16. The button assembly as claimed in claim 6, wherein the game controller further includes a fastening frame and a circuit board, the fastening frame is mounted under the button assembly, the circuit board is mounted under the fastening frame and the button assembly, one side of the fastening frame opens a guiding groove vertically penetrating through the fastening frame, the pressure sensor module has the fastening portion, and a first capacitor extended outward from one side of the fastening portion, a bottom surface of the circuit board is equipped with a second capacitor, the first capacitor is bent downward and passes through the guiding groove, and then is bent towards the second capacitor, a tail end of the first capacitor is connected with the second capacitor.

17. A button assembly adapted for being mounted in a game controller, the game controller including a circuit board, and a fastening frame mounted on the circuit board, a bottom surface of the circuit board being equipped with a second capacitor, one side of the fastening frame opening a guiding groove vertically penetrating through the fastening frame, the button assembly comprising:

a pedestal, two opposite sides of the pedestal having two limiting portions oppositely protruded outward;

a pressure sensor module mounted in the pedestal, the pressure sensor module having a fastening portion, and a first capacitor extended outward from one side of the fastening portion, the first capacitor being bent downward and passing through the guiding groove, and then being bent towards the second capacitor, a tail end of the first capacitor being connected with the second capacitor, a top of the pressure sensor module having a soft material sensor, the soft material sensor having an elasticity; and a key cap covered on the pressure sensor module, a bottom surface of the key cap having a contact portion contacting with the pressure sensor module, two opposite sides of the key cap having two active portions protruded outward, the two active portions being mounted to the two limiting portions, respectively, in processes of pressing and releasing the key cap, the two active portions moving downward and upward with respect to the two limiting portions.

18. The button assembly as claimed in claim 17, wherein the pedestal has a base portion, two opposite sides of a peripheral surface of the base portion protrude outward and then extend upward to form two limiting blocks, a middle of the pedestal has an accommodating groove surrounded by the two limiting blocks, the pressure sensor module is mounted in the accommodating groove.

* * * * *